(12) United States Patent
Choi

(10) Patent No.: US 7,819,098 B2
(45) Date of Patent: Oct. 26, 2010

(54) VARIABLE VALVE TIMING APPARATUS AND CONTROL METHOD FOR THE SAME

(75) Inventor: Byong Young Choi, Incheon (KR)

(73) Assignee: Hyundai Motor Company, Seoul (KR)

( * ) Notice: Subject to any disclaimer, the term of this patent is extended or adjusted under 35 U.S.C. 154(b) by 359 days.

(21) Appl. No.: 11/966,090

(22) Filed: Dec. 28, 2007

(65) Prior Publication Data

US 2009/0126663 A1 May 21, 2009

(30) Foreign Application Priority Data

Nov. 19, 2007  (KR) ...................... 10-2007-0118033

(51) Int. Cl.
*F01L 1/34* (2006.01)
(52) U.S. Cl. ............... 123/90.17; 123/90.15; 123/90.31
(58) Field of Classification Search .............. 123/90.15, 123/90.17, 90.31
See application file for complete search history.

(56) References Cited

U.S. PATENT DOCUMENTS

2003/0230267 A1* 12/2003 Quinn, Jr. ................ 123/90.17

FOREIGN PATENT DOCUMENTS

| JP | 5-106411 A | 4/1993 |
|---|---|---|
| JP | 2003-49671 A | 2/2003 |

* cited by examiner

*Primary Examiner*—Zelalem Eshete
(74) *Attorney, Agent, or Firm*—Morgan, Lewis & Bockius LLP

(57) ABSTRACT

A variable valve timing device delivers rotation of a crankshaft to a first camshaft, and to a second camshaft through the first camshaft. First and second variable valve timing units change phases of the first and second camshafts, respectively. A crankshaft sensor senses angle changes of the crankshaft. A camshaft sensor senses angle changes of the second camshaft. A control portion controls the phase of the second camshaft by controlling the second variable valve timing unit, or controls the phases of both camshafts by controlling the first variable valve timing unit, according to signals from the crankshaft sensor and the camshaft sensor. Also, a control method for such a device. One of several possible modes is selected. Target phases of the camshafts corresponding to an operation of an engine are determined. Phases of the first camshaft and/or the second camshaft are controlled according to the selected mode.

10 Claims, 5 Drawing Sheets

VARIABLE VALVE TIMING APPARATUS AND CONTROL METHOD FOR THE SAME

CROSS-REFERENCE TO RELATED APPLICATION

This application claims priority to, and the benefit of, Korean Patent Application No. 10-2007-0118033, filed in the Korean Intellectual Property Office on Nov. 19, 2007, the entire contents of which are incorporated herein by reference.

BACKGROUND OF THE INVENTION (a) Field of the Invention

The present invention relates to a variable valve timing device and a control method for the same.

(b) Description of the Related Art

A typical combustion chamber of an automotive engine is provided with an intake valve for supplying the air/fuel mixture and an exhaust valve for expelling the burned gas. The intake and exhaust valves are opened and closed by a valve lift apparatus connected to a crankshaft.

A conventional valve lift apparatus has a fixed valve lift amount due to a fixed cam shape. Therefore, it is impossible to adjust the amount of a gas that is being introduced or exhausted.

If the valve lift apparatus is designed for low driving speeds the valve open time and amount are not sufficient for high speeds. On the other hand, if the valve lift apparatus is designed for high speeds, the opposite is true.

One proposed system to improve efficiency in high and low driving speeds includes cams that have different profiles. At high speeds, a high lift cam that has a high lift profile and increases opening angles of valves is used, and at low speeds, a low lift cam that has low lift profile and decreases opening angles of valves is used.

Another proposed system includes a camshaft timing gear provided with a variable valve timing unit in front of an intake valve camshaft, that changes phase angles of the cams without changing opening/closing valve timing.

However, a variable valve device that uses a variable valve timing unit controls only a phase angle of an intake valve, so efficient control of valve timing is difficult. Alternatively, variable valve timing units must be provided with camshaft phase sensors at both intake and exhaust camshafts. Controlling such a unit is very complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

A variable valve timing device delivers rotation of a crankshaft to a first camshaft, and to a second camshaft through the first camshaft. A first variable valve timing unit changes a phase of the first camshaft. A second variable valve timing unit changes a phase of the second camshaft. A crankshaft sensor senses angle changes of the crankshaft. A camshaft sensor senses angle changes of the second camshaft. A control portion controls the phase of the second camshaft by controlling the second variable valve timing unit, or controls the phases of both camshafts by controlling the first variable valve timing unit, according to signals from the crankshaft sensor and the camshaft sensor.

The first camshaft may be an exhaust camshaft and the second camshaft may be an intake camshaft. Alternatively, the first camshaft may be an intake camshaft and the second camshaft may be an exhaust camshaft.

The control portion may select one of several possible modes, and control the camshafts according to the selected mode. The modes may be: a first mode in which the phase of the second camshaft is retarded and the phases of both camshafts are adjusted by adjusting the phase of the first camshaft, a second mode in which the phase of the second camshaft is advanced and the phases of both camshafts are adjusted by adjusting the phase of the first camshaft, a third mode in which the phase of the first camshaft is advanced and the phase of the second camshaft is adjusted, and a fourth mode in which the phase of the first camshaft is retarded and the phase of the second camshaft is adjusted.

A control method for a variable valve timing device that delivers rotation of a crankshaft to a first camshaft, and to a second camshaft through the first camshaft, is also disclosed. One of several possible modes is selected. Target phases of the first camshaft and the second camshaft corresponding to an operation of an engine are determined. Phases of the first camshaft and/or the second camshaft are controlled according to the selected mode. The modes include: a first mode in which the phase of the first camshaft is retarded and the phases of both camshafts are adjusted, a second mode in which the phase of the second camshaft is advanced and the phases of both camshafts are adjusted, a third mode in which the phase of the first camshaft is advanced and the phase of the second camshaft is adjusted, and a fourth mode in which the phase or the first camshaft is retarded and the phase of the second camshaft is adjusted.

The first and second modes may include detecting an actual phase of the second camshaft and calculating an actual phase of the first camshaft based on the actual phase of the second camshaft. The third and fourth modes may include detecting an actual phase of the second camshaft.

DETAILED DESCRIPTION OF PREFERRED EMBODIMENTS

An exemplary embodiment the present invention will be described more fully hereinafter with reference to the accompanying drawings.

Figure 1:
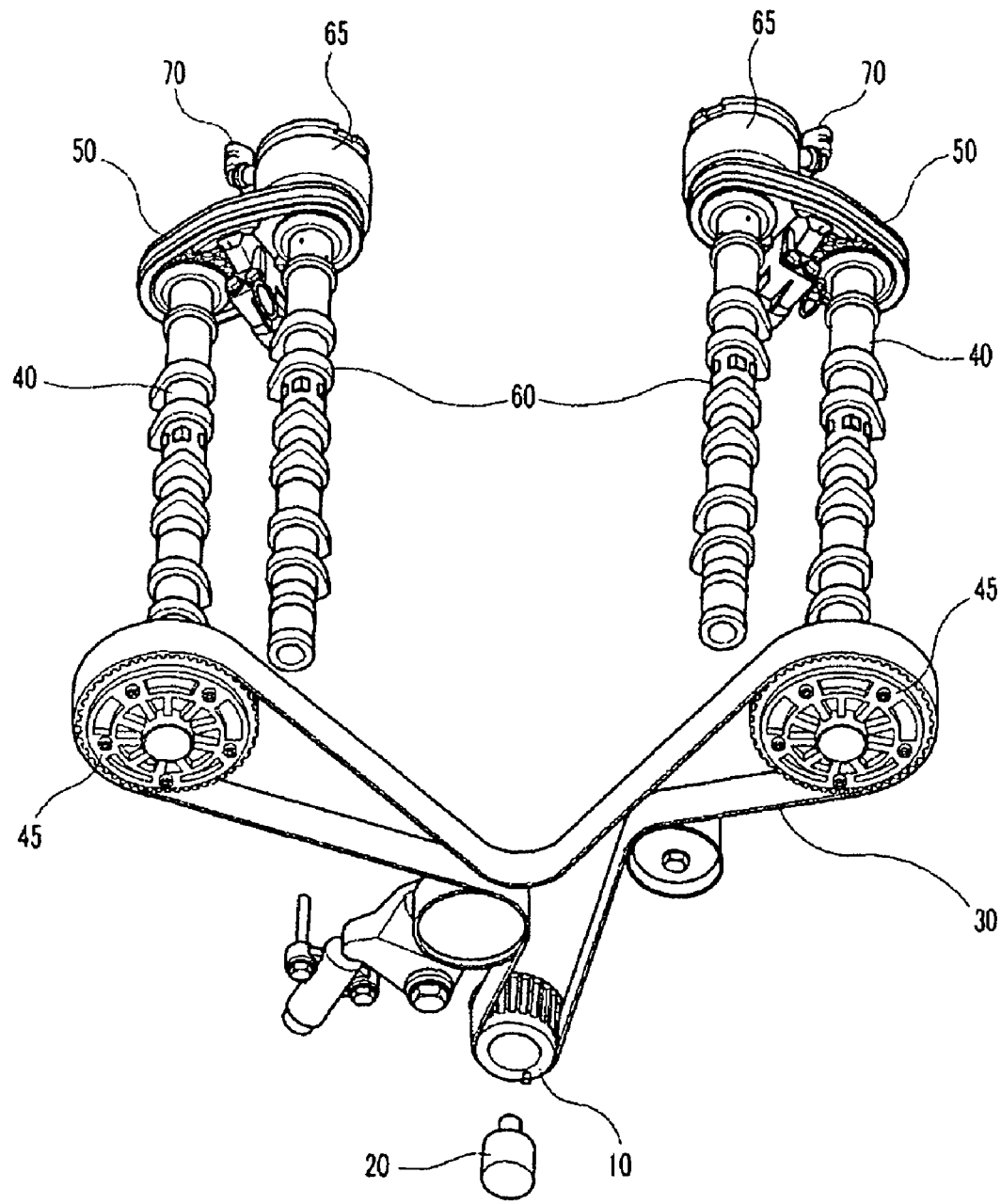
FIG. 1 is a perspective view of a variable valve timing device according to an exemplary embodiment of the present invention.

As shown in FIG. 1, in a variable valve timing device according to an exemplary embodiment of the present invention, rotation of a crankshaft 10 is transferred to a first camshaft 40 by a first power delivery portion 30, and rotation of the first camshaft 40 is transferred to a second camshaft 60 by a second power delivery portion 50.

A first variable valve timing unit 45 and a second variable valve timing unit 65 are provided to the first camshaft 40 and the second camshaft 60, respectively.

A crankshaft sensor 20 detects phase angle changes of the crankshaft 10. A camshaft sensor 70 detects phase angle changes of the second camshaft 60.

Figure 3:
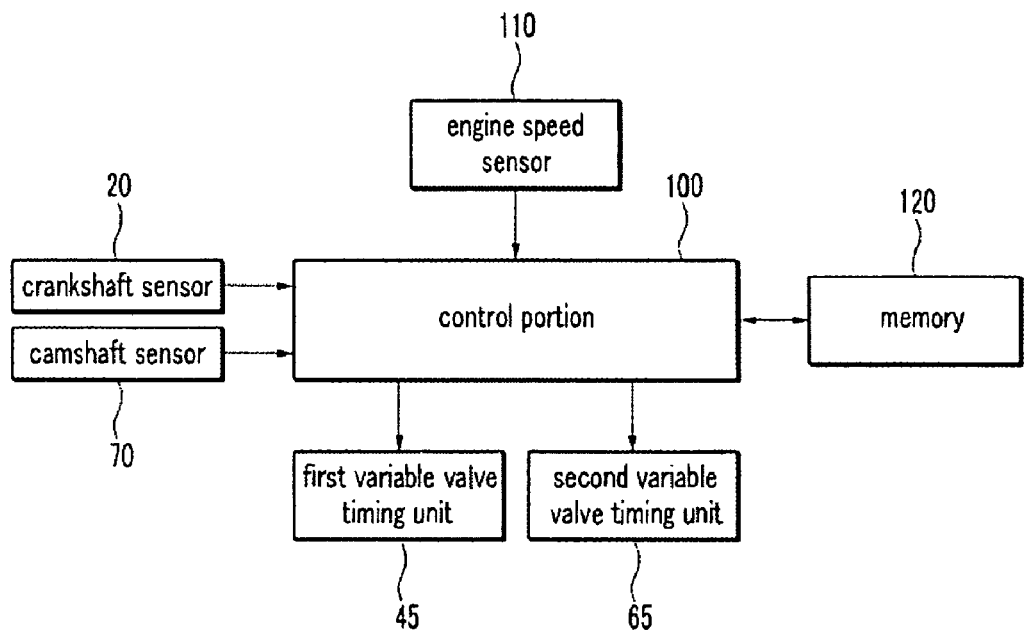
FIG. 3 is a block diagram showing a variable valve timing device according to an exemplary embodiment of the present invention.

Referring to FIG. 3, a control portion 100 controls the first and second variable valve timing units 45, 65. The control portion 100 receives signals of phase angle changes from the crankshaft sensor 20 and the camshaft sensor 70.

An engine speed sensor 110 detects an operational state of an engine and transmits a signal to the control portion 100. In addition to the engine speed sensor 110, other conditions of operational state of the vehicle may be detected by other state detectors (not shown).

A memory 120 communicates with the control portion 100 and transmits data to the control portion 100 for operation.

Figure 2:
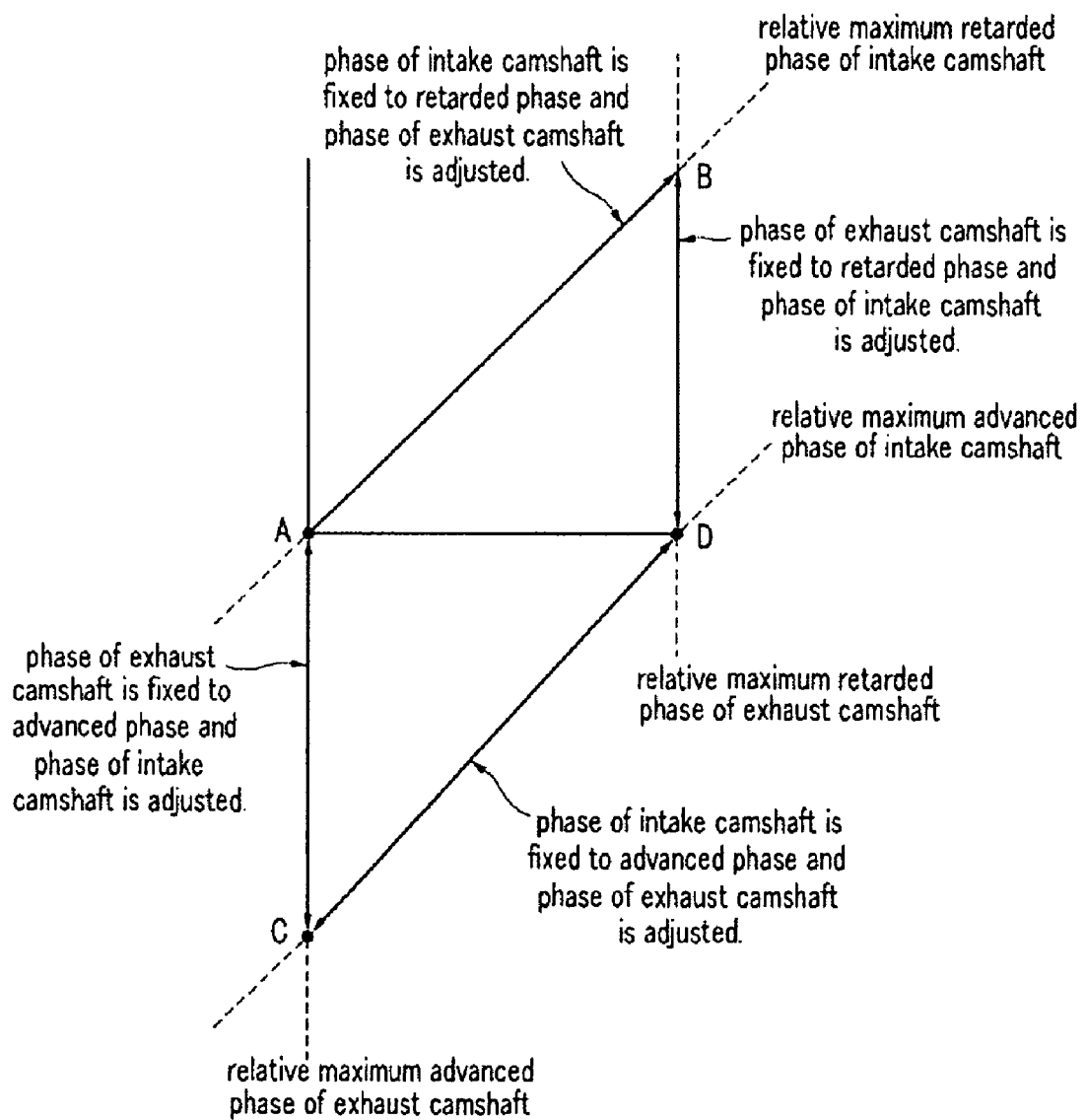
FIG. 2 illustrates a control principle regarding phases of an intake camshaft and an exhaust camshaft of a variable valve timing device according to an exemplary embodiment of the present invention.

Referring to FIGS. 1-2, if the phase angle of the first camshaft 40 is changed by the first variable valve timing unit 45, the phase angle of the second camshaft 60 also changes, due to the rotation of first camshaft 40 being transferred to the second camshaft 60 by the second power delivery portion 50.

However, the converse is not true. That is, the phase angle of the second camshaft 60 can change without changing the phase angle of the first camshaft 40.

In the example illustrated in FIG. 2, the first camshaft 40 is an exhaust camshaft and the second camshaft 60 is an intake camshaft, but the present invention is not limited thereto.

Opening and closing timing of the camshafts is controlled by selectively using four control modes.

Figure 4:
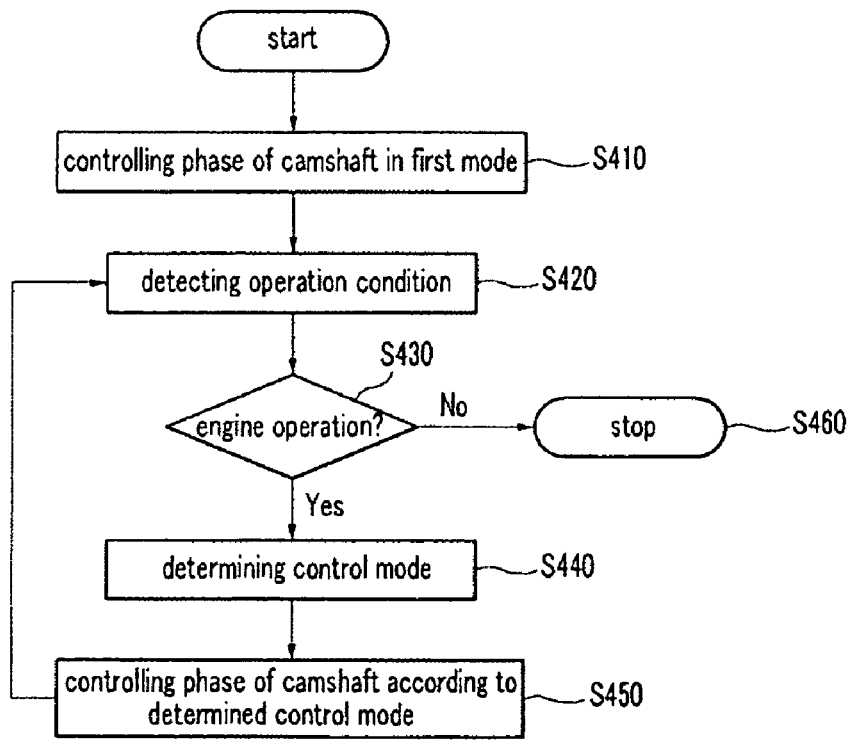
FIG. 4 is a flow chart of a control method of a variable valve timing device according to an exemplary embodiment of the present invention.

Referring to FIG. 2, FIG. 4, and FIG. 5, in the first mode, the phase of the intake camshaft 60 is retarded, and the phase of the intake camshaft 60 and the exhaust camshaft 40 are simultaneously adjusted by adjusting the phase of the exhaust camshaft 40.

In the second mode, the phase of the intake camshaft 60 is advanced, and the phases of the camshafts 40, 60 are simultaneously adjusted by adjusting the phase of the exhaust camshaft 40.

In the third mode, the phase of the exhaust camshaft 40 is advanced, and the phase of the intake camshaft 60 is adjusted.

In the fourth mode, the phase of the exhaust camshaft 40 is retarded, and the phase of the intake camshaft 60 is adjusted.

The retarded phase and the advanced phase may be maximally retarded and maximally advanced phases, respectively. These are relative amounts that can be set in camshafts of the first variable valve timing unit 45 and the second variable valve timing unit 65, and that can be variable according to the kind of engine.

Referring to FIG. 2, in the first mode, the phases of the exhaust camshaft 40 and the intake camshaft 60 are simultaneously controlled from "A" to "B".

A phase change ratio of the intake camshaft 60 is determined according to the second power delivery portion 50. The phase change ratio can be changed according to required performance.

In the third mode, the phase of the exhaust camshaft 40 is advanced, and the phase of the intake camshaft 60 is changed from "A" to "C".

In the second mode, the phases of the exhaust camshaft 40 and the intake camshaft 60 are simultaneously controlled from "C" to "D".

In the fourth node the phase of the exhaust camshaft 40 is retarded, and the phase of the intake camshaft 60 is changed from "B" to "D".

Typically, when a vehicle stalls, an exhaust valve is fixed to a retarded phase and an intake valve is fixed to an advanced phase, so it is preferred that a starting control mode is the first mode as shown in FIG. 4, but the present invention is not limited thereto.

Hereinafter, a method for determining phase of each camshaft will be explained.

In the first mode, a phase of the intake camshaft 60 is detected by the camshaft sensor 70, and the detected phase is determined to be a present phase of the intake camshaft 60.

A phase of the exhaust camshaft 40 is determined by subtracting a first predetermined phase from the phase of the intake camshaft 60. The first predetermined phase is a difference between the phase of the exhaust camshaft 40 and the phase of the intake camshaft 60 when the phase of the exhaust camshaft 40 is the retarded phase and the phase of the intake camshaft 60 is the advanced phase.

In the second mode, a phase of the intake camshaft 60 is detected by the camshaft sensor 70, and the detected phase is determined to be a present phase of the intake camshaft 60. Further, a phase of the exhaust camshaft 40 is determined by subtracting a second predetermined phase from the phase of the intake camshaft 60.

The second predetermined phase is a difference between the phase of the exhaust camshaft 40 and the phase of the intake camshaft 60 when the phase of the exhaust camshaft 40 is the advanced phase and the phase of the intake camshaft 60 is the advanced phase.

In the third mode, a phase of the intake camshaft 60 is detected and the detected phase is determined to be a present phase of the intake camshaft 60, and a phase of the exhaust camshaft 40 is determined to be the advanced phase.

In the fourth mode, a phase of the intake camshaft 60 is detected and the detected phase is determined to be a present phase of the intake camshaft 60, and a phase of the exhaust camshaft 40 is determined to be the retarded phase.

The first predetermined phase and the second predetermined phase are saved in the memory 120, and are used when the control portion 100 determines a control mode. Also, an engine operation condition can be saved in the memory 120 and used for controlling.

The control portion 100 using signals from each or the sensors 20, 70, and 110 and operation conditions to determine a target phase corresponding to the operation conditions of an engine, and controls phases of the intake camshaft 60 and the exhaust camshaft 40.

The control steps can be achieved using a target phase that is saved in the memory corresponding to an operation condition of an engine.

Referring to FIG. 4 and FIG. 5, a phase of the camshaft is controlled by the first mode (S410) when the engine is turned on.

An operation condition of an engine is detected (S420), and control steps stop when the engine is not operated (S460) or control steps go ahead when the engine is operated.

The control portion 100 determines a control mode according to an operation condition of the engine (S440), and controls a phase of the camshaft according to the determined control mode (S450).

The operation condition is then detected again (S420) and the control continues.

In FIG. 5, control charts are shown for each control mode.

Figure 5A:
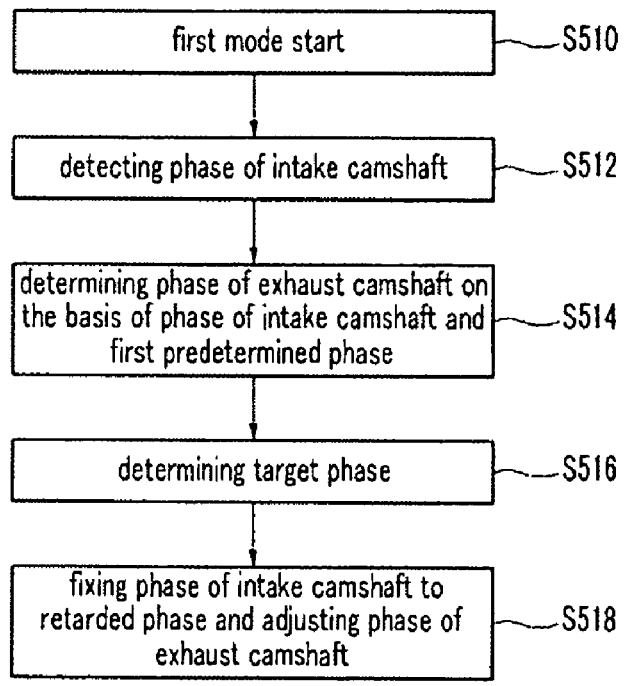
FIG. 5A is a flow chart of a control method of a first mode of a variable valve timing device according to an exemplary embodiment of the present invention.

In the first control node, as shown in FIG. 5A, the first mode starts (S510), a phase of the intake camshaft 60 is detected (S512), and a phase of the exhaust camshaft 40 is determined by a difference between a phase of the intake camshaft 60 and a phase of the first predetermined phase (S514). The control portion 100 determines a target phase according to data in the memory 120 and detected operation conditions (S516). A phase of the intake camshaft 60 is fixed to the retarded phase, and a phase of the exhaust camshaft 40 is controlled on the basis of the target phase (S518).

Figure 5B:
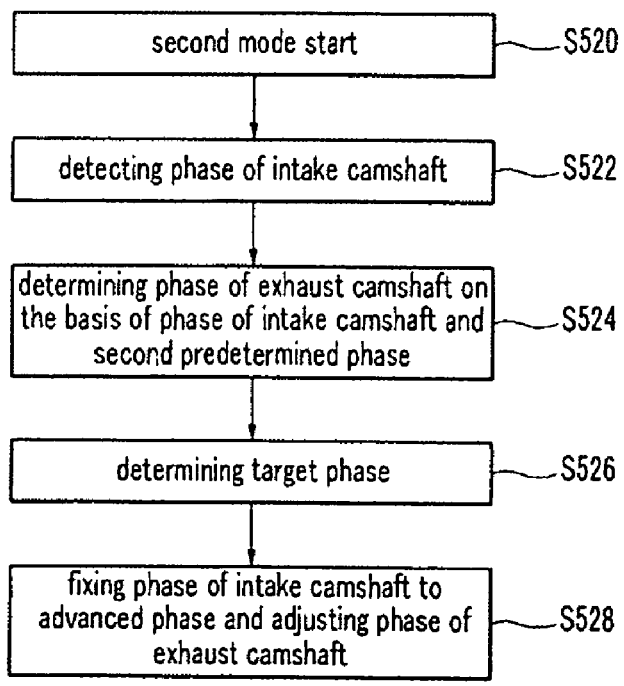
FIG. 5B is a flow chart of a control method of a second mode of a variable valve timing device according to an exemplary embodiment of the present invention.

In the second mode, as shown in FIG. 5B, the second mode starts (S520), a phase of the intake camshaft 60 is detected (S522), and a phase of the exhaust camshaft 40 is determined by a difference between a phase of the intake camshaft 60 and a phase of the second predetermined phase (S524). The control portion 100 determines a target phase according to data in the memory 120 and detected operation conditions (S526). A phase of the intake camshaft 60 is fixed to the advanced phase and a phase of the exhaust camshaft 40 is controlled on the basis of the target phase (S528).

Figure 5C:
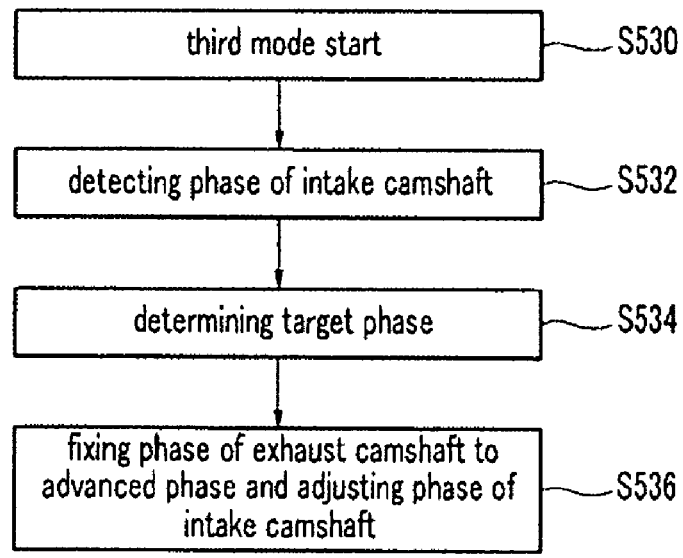
FIG. 5C is a now chart of a control method of a third mode of a variable valve timing device according to an exemplary embodiment of the present invention.

In the third mode, as shown in FIG. 5C, the third mode starts (S530), and a phase of the intake camshaft 60 is detected (S5532). The control portion 100 determines a target phase according to data in the memory 120 and detected operation conditions (S534). A phase of the exhaust camshaft 40 is fixed to the advanced phase, and a phase of the intake camshaft 60 is controlled on the basis of the target phase (S536).

Figure 5D:
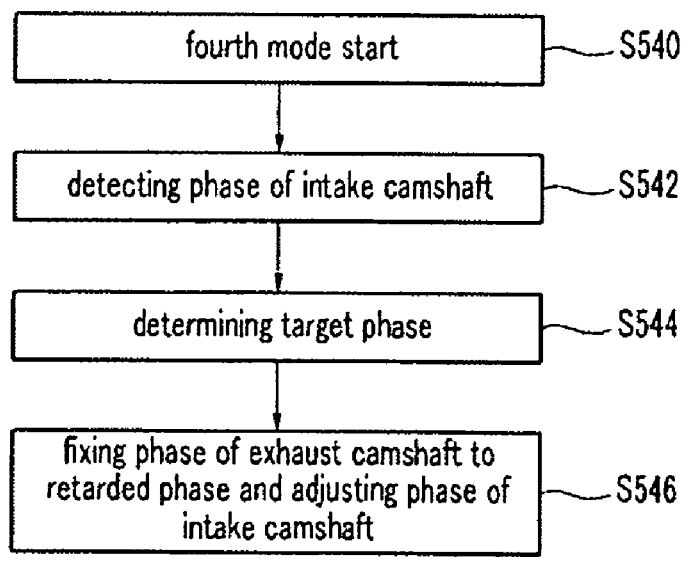
FIG. 5D is a flow chart of a control method of a fourth mode of a variable valve timing device according to an exemplary embodiment of the present invention.

In the fourth mode, as shown in FIG. 5D, the fourth mode starts (S540), and a phase of the intake camshaft 60 is detected (S542). The control portion 100 determines a target phase according to data in the memory 120 and detected operation conditions (S544). A phase of the exhaust camshaft 40 is fixed to the retarded phase, and a phase of the intake camshaft 60 is controlled on the basis of the target phase (S546).

The exemplary variable valve timing device and control method can control the phases of the intake camshaft 60 and the exhaust camshaft 40 so that control response speed is fast and malfunctions can be prevented. The control is achieved with one camshaft sensor so that the number of elements, production cost, and maintenance are reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A variable valve timing device that delivers rotation of a crankshaft to a first camshaft, and to a second camshaft through the first camshaft, comprising:
    a first variable valve timing unit for changing a phase of the first camshaft;
    a second variable valve timing unit for changing a phase of the second camshaft;
    a crankshaft sensor that senses angle changes of the crankshaft;
    a camshaft sensor that senses angle changes of the second camshaft; and
    a control portion for controlling the phase of the second camshaft by controlling the second variable valve timing unit, or controlling the phases of both camshafts by controlling the first variable valve timing unit, according to signals from the crankshaft sensor and the camshaft sensor,
    wherein the control portion selects one of a plurality of modes and controls the camshafts according to the selected mode,
    wherein the modes comprise:
    a first mode in which the phase of the second camshaft is retarded and the phases of both camshafts are adjusted by adjusting the phase of the first camshaft;
    a second mode in which the phase of the second camshaft is advanced and the phases of both camshafts are adjusted by adjusting the phase of the first camshaft;
    a third mode in which the phase of the first camshaft is advanced and the phase of the second camshaft is adjusted; and
    a fourth mode in which the phase of the first camshaft is retarded and the phase of the second camshaft is adjusted.

2. The variable valve timing device of claim 1, wherein the first camshaft comprises an exhaust camshaft and the second camshaft comprises an intake camshaft.

3. The variable valve timing device of claim 1, wherein the first camshaft comprises an intake camshaft and the second camshaft comprises an exhaust camshaft.

4. A control method for a variable valve timing device that delivers rotation of a crankshaft to a first camshaft, and to a second camshaft through the first camshaft, comprising:
    selecting one of a plurality of modes,
    determining target phases of the first camshaft and the second camshaft corresponding to an operation of an engine, and
    controlling phases of the first camshaft and/or the second camshaft according to the selected mode,
    wherein the modes comprise:
    a first mode in which the phase of the first camshaft is retarded and the phases of both camshafts are adjusted;
    a second mode in which the phase of the second camshaft is advanced and the phases of both camshafts are adjusted;
    a third mode in which the phase of the first camshaft is advanced and the phase of the second camshaft is adjusted; and
    a fourth mode in which the phase of the first camshaft is retarded and the phase of the second camshaft is adjusted.

5. The variable valve timing control method of claim 4, wherein the first camshaft comprises an exhaust camshaft and the second camshaft comprises an intake camshaft.

6. The variable valve timing control method of claim 4, wherein the first camshaft comprises an intake camshaft and the second camshaft comprises an exhaust camshaft.

7. The variable valve timing control method of claim 4, wherein the first mode comprises:
    detecting an actual phase of the second camshaft; and
    calculating an actual phase of the first camshaft based on the actual phase of the second camshaft.

8. The variable valve timing control method of claim 4, wherein the second mode comprises:
    detecting an actual phase of the second camshaft; and
    calculating an actual phase of the first camshaft based on the actual phase of the second camshaft.

9. The variable valve timing control method of claim 4, wherein the third mode comprises detecting an actual phase of the second camshaft.

10. The variable valve timing control method of claim 4, wherein the fourth mode comprises detecting an actual phase of the second camshaft.

* * * * *